United States Patent [19]

Feneberg et al.

[11] 4,215,933
[45] Aug. 5, 1980

[54] PROJECTION SYSTEM FOR COPYING MACHINES

[75] Inventors: Paul Feneberg, Buchendorf; Georg Königl, Munich; Günther Kirchhof, Taufkirchen; Anton Schätz, Munich, all of Fed. Rep. of Germany

[73] Assignee: AGFA-Gevaert, A.G., Leverkusen, Fed. Rep. of Germany

[21] Appl. No.: 971,079

[22] Filed: Dec. 19, 1978

[30] Foreign Application Priority Data

Dec. 22, 1977 [DE] Fed. Rep. of Germany ....... 2757386

[51] Int. Cl.² ............................................. G03B 27/50
[52] U.S. Cl. ..................................................... 355/50
[58] Field of Search ...................... 355/46, 50, 51, 67 S, 355/1, 8, 11, 67

[56] References Cited

U.S. PATENT DOCUMENTS

| | | | |
|---|---|---|---|
| 3,535,036 | 10/1970 | Starkweather | 355/11 |
| 3,592,542 | 7/1971 | Käufer et al. | 355/50 |
| 3,655,284 | 4/1972 | Agliata | 355/50 X |
| 3,884,573 | 5/1975 | Franklin | 355/51 |
| 4,025,189 | 5/1977 | Pugsley | 355/50 X |

*Primary Examiner*—Donald Griffin
*Attorney, Agent, or Firm*—Michael J. Striker

[57] ABSTRACT

A copying-machine projection system successively projects successive strip-shaped zones of an original onto successive strip-shaped zones of a photosensitive surface. The projection system is of the type comprising at least one row of component projection objectives extending transverse to the direction of relative movement as between projection system and photosensitive surface. The individual component projection objectives are constituted by corresponding lenticular elements of plural lens bars, the lens bars extending transverse to the relative-movement direction and being provided with respective rows of lenticular elements. The projection system projects a strip-shaped image onto the photosensitive surface but also forms an intermediate image plane. Located at the latter is a lens-aperture plate, the lens apertures of which are so shaped that the adjoining boundaries of adjoining lens apertures extend at an angle relative to the direction perpendicular to the relative-movement direction, this angle being at most equal to 80°. As a result of this inclination, if the individual light fields projected improperly overlap, improperly overlap more or less than they nominally should, or fail to contact each other, the resultant boost or decrease in illumination is not confined to a longitudinally extending stripe which would be visible in the final copy but instead is averaged out over a surface area whose breadth, measured perpendicular to the relative-movement direction is substantially greater than the breadth of the excessive or absent overlap.

17 Claims, 24 Drawing Figures

PROJECTION SYSTEM FOR COPYING MACHINES

BACKGROUND OF THE INVENTION

The present invention concerns copying-machine projection systems of the type in which successive strip-shaped zones of the original being copied are successively projected onto successive zones of a photosensitive surface, and in particular using a projection system which comprises plural lens bars, each lens bar comprising one or more rows of lenses or lenticular elements extending transverse to the direction of relative movement as between the projection system and the photosensitive surface, the projection system comprising one or more rows of projection objectives, such rows likewise extending transverse to the direction of relative movement, with each individual or component objective being constituted by plural, corresponding lenses on the plural lens bars. In systems of the type in question, an intermediate image plane is established intermediate the lens bars.

Such a system is known, for example, from commonly owned U.S. Pat. No. 3,592,542. In that system, each image element projected onto the photosensitive surface is constituted by image light coming not from just one associated component objective, but rather from plural adjoining component objectives, i.e., with each component objective contributing to the formation of plural adjoining image elements on the photosensitive surface, e.g., as shown in FIG. 2 of that patent. As a result, the image elements projected onto the photosensitive surface tend to overlap one another, and in the system of that patent an attempt is made to positively exploit this fact; conversely expressed, the extent of the overlaps is to be so predetermined that the image-light overlap effects on the ultimate copy are not readily perceived by human vision.

However, experience has shown that, when the needs of cheap mass production are to be met, it is excessively difficult to properly and precisely enough predetermine the various image-element overlaps, i.e., the precise locations and amounts of the various image-element overlaps. An alternative approach would be to produce each individual image element formed on the photosensitive surface, not using plural adjoining component objectives in cooperation, but instead on the basis of one image element per component objective. In that event, however, it has not been possible, in any direct or simple way, to get adjoining image elements projected onto the photosensitive surface to precisely and perfectly adjoin at their adjoining boundaries, i.e., with neither a positive overlap nor a negative overlap, a negative overlap being a dead (more or less unilluminated) space between the adjoining boundaries of adjoining image elements. For example, it will be understood that the constituent objectives of the system, each constituted by corresponding and cooperating lens elements on the plural lens bars, are spaced one from the next in the direction transverse to the direction of relative movement between the photosensitive surface and the projection system. If the constituent objectives exhibit transverse decentering, i.e., if one constituent objective is somewhat closer to one of its two neighbors than to the other of its two neighbors, this results in a positive image-element overlap and/or a negative image-element overlap on the photosensitive surface. In the case of a positive overlap, then at the overlap location more light is incident on the photosensitive surface than in the region to either side of the overlap location; likewise, in the case of a negative overlap, less light is incident at the overlap location than in the region to either side thereof. Furthermore, the overlap location itself is fixed, i.e., measured for example relative to the two ends of each of the lens bars employed. Accordingly, during the relative movement between the projection system and the photosensitive surface, the location of the image-element overlap shifts, in exactly the direction of such relative movement, along the photosensitive surface. As a result, the ultimate copy produced will exhibit bright and/or dark stripes which extend in the corresponding direction, or will exhibit a streaky looking image structure. In addition thereto, one must reckon with visually perceivable effects resulting from the $\cos^4$ drop-off effect for each individual component objective. Of course, these stripy or streaky effects become worse, in the case of copying machines which produce steep-gradation images, i.e., wherein the difference between the minimum and maximum values of image darkness produced on the copy spans a wide range.

SUMMARY OF THE INVENTION

Accordingly, it is the general object of the invention to provide an exposure system of the type in question, but of such a design that, even with the manufacturing tolerances which must be allowed for cheap mass-production fabrication, the image projected onto the photosensitive surface exhibits a very high degree of exposure uniformity, certainly avoiding the stripes or streaky effects referred to above.

In accordance with the present invention, this is achieved by locating, in the aforementioned intermediate image plane of the lens-bar projection system, an aperture plate formed with one or more rows of lens apertures. The adjoining boundary lines of adjoining lens apertures do not extend in the direction of relative movement between the projection system and the photosensitive surface, but instead at an angle thereto. In particular, such boundary lines make an angle equal or smaller than 80° with that direction which is perpendicular to the aforementioned direction of relative movement.

According to a further concept of the invention, the lens apertures, as projected or imaged onto the photosensitive surface, supplement one another in the relative-movement direction in such a manner that for all the image elements the sum of the fractional exposures thereof is constant as considered in the relative-movement direction.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
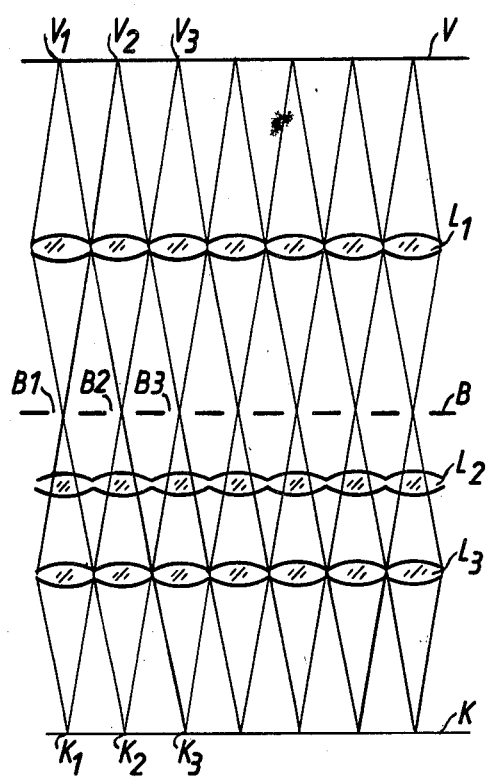
FIG. 1 is a longitudinal section through a schematically depicted embodiment of the inventive copying-machine projection system.

FIG. 1 is a longitudinal section taken through a schematically depicted exemplary embodiment of the inventive copying-machine projection system. Individual image elements V1, V2, V3, . . . , on an original V to be copied are projected as image elements K1, K2, K3, . . . , onto a photosensitive surface K by means of plural lens bars L1–L3 arranged one after the other. The direction of relative movement as between the projection system and the photosensitive surface K is perpendicular to the drawing plane in FIG. 1. Each lens bar L1–L3 may comprise a single row of lenses, i.e., as shown in FIG. 1, it being understood that the full row of lenses is not shown in FIG. 1, or may comprise one or more further rows of lenses located behind the illustrated rows on the same bars. The individual or component projection objectives of the projection system are constituted by the cooperating corresponding lens elements on the plural bars; for example, one component projection objective, i.e., the one extending from V1 to K1, is constituted by three correspondingly located lens elements on the three bars L1–L3. The illustrated projection system exhibits an intermediate image plane at which is positioned a lens-aperture plate B. At this intermediate image plane, the constituent image elements being projected are reduced in scale by a factor of between about 1.1 and about 2.5. Lens-aperture plate B is provided with one lens aperture B1, B2, B3, . . . , per component projection objective. Each lens aperture in plate B acts as a field stop for its associated component projection objective, and therefore determines the shape of the associated image element projected onto photosensitive surface K.

In the illustrated, exemplary projection system, the two lens bars L1 and L3 serve to project the strip-shaped zone on the original which is, at any given time, to be projected onto photosensitive surface K, whereas lens bar L2 merely serves as a field lens, lens bar L2 being located close to the intermediate-image plane. Persons skilled in the art will understand that field-lens lens bar L2 could be horizontally bisected, with the lens-aperture plate B located sandwiched between its two layers exactly at the intermediate-image plane, for a more ideal optical action.

Figure 2:
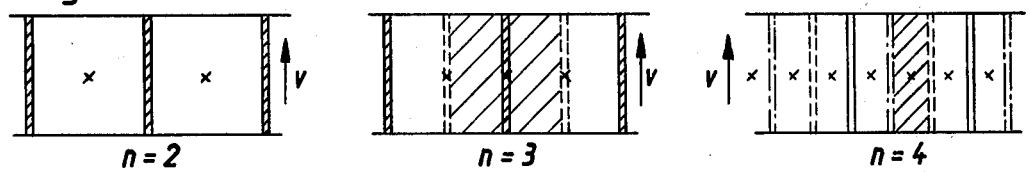
FIGS. 2-6 are explanatory diagrams employed to elucidate the principle underlying the present invention.

In commonly owned U.S. Pat. No. 3,592,542, already mentioned, it has been proposed to use plural adjoining component objectives to project each individual image element, e.g., V1, on the original V, onto the photosensitive surface K, in the form of the respective individual imaged element, e.g., K1, as shown in FIG. 2 of the patent.

If the lens apertures B1, B2, B3, . . . , of the lens-aperture plate B were shaped as simple rectangles or squares, with two of their edges exactly parallel to the relative-movement direction and the other two perpendicular thereto, then on the photosensitive surface K, if adjoining light fields exhibited a positive overlap or a negative overlap (spacing), dark or bright strips would form on the photosensitive surface K, extending in the relative-movement direction, and upon actual relative movement would convert into lengthy dark or bright stripes extending along the whole length of the entire image. In particular, the positive or negative overlaps as between adjoining light fields projected onto the photosensitive surface results, most especially, from imperfect spacing of adjoining component objectives, measured along the length of the lens bars, which is to say measured perpendicular to the relative-movement direction, and likewise from imperfect registration of the corresponding lens elements on the plural elements with one another and with their associated lens apertures B1, B2, B3, . . . .

Numerically, if n represents the number of component objectives involved in a positive or negative image-element overlap, and if the average illumination of the photosensitive surface K (e.g., imagining that the original is a sheet of white paper bearing no image) is 1 (unity), then the factor by which the illumination of the surface K at the overlap zones differs from the average illumination can be expressed as $n/(n-1)$ in the case of positive overlaps, and as $(n-2)/(n-1)$ in the case of negative overlaps. For values of n from 2 through 21, the following tabulation will make clear the extent to which positive or negative overlaps result in visually perceivable bright or dark stripes:

| n | pos./neg. overlap | n | pos./neg. overlap |
|---|---|---|---|
| 2 | 2.00/0 | 12 | 1.091/0.909 |
| 3 | 1.50/0.50 | 13 | 1.083/0.917 |
| 4 | 1.33/0.67 | 14 | 1.077/0.923 |
| 5 | 1.25/0.75 | 15 | 1.071/0.929 |
| 6 | 1.20/0.80 | 16 | 1.067/0.933 |
| 7 | 1.17/0.83 | 17 | 1.063/0.937 |
| 8 | 1.14/0.86 | 18 | 1.059/0.941 |
| 9 | 1.13/0.87 | 19 | 1.056/0.944 |
| 10 | 1.11/0.89 | 20 | 1.053/0.947 |
| 11 | 1.10/0.90 | 21 | 1.050/0.950 |

The significance of this tabulation will be explained with reference to FIG. 2, which depicts the situations involved for n=2, for n=3, and for n=4.

For n=2, two adjoining component projection objectives are involved in a positive or negative overlap situation. At the extreme left in FIG. 2, the central crosses represent the optical axes of two adjoining component objectives; the shaded area between them represents the zone of positive or negative overlap. Lens apertures B1, B2, B3, . . . , are here presumed to be simple adjoining squares, and the illumination within each to be uniform. In the case of a positive overlap, it will be clear that the central shaded area corresponds to a zone of doubled illumination, as indicated by the entry 2.00 at n=2 in the above tabulation. In the case of a negative overlap, it will be understood that the central shaded area corresponds to a strip where no illumination at all is incident, i.e., zero illumination, and this is indicated by the entry 0 at n=2 in the above tabulation. For this case, i.e., for the case where n=2, it is being assumed that each image element to be formed is nominally to be produced by a single respective component objective, not in the manner of U.S. Pat. No. 3,592,542. As a result of relative movement in direction v as between the projection system and the photosensitive surface, the strip at which the positive or negative overlap is located will extend itself, in the relative movement direction, along the whole of the image formed on the photosensitive surface K.

At the middle of FIG. 2, there is shown the case where n=3, i.e., where three component objectives are involved in a positive or negative image-element overlap situation. The optical axes of the three component objectives involved are represented by the three crosses. In this case, the rectangular fields of the outer two objectives should nominally adjoin perfectly and should each overlap, to the extent of exactly 50%, the rectangular field of the objective intermediate them. However, as represented by the shaded strip coincident with the middle optical axis, a positive or negative overlap exists here, as between the outer two light fields. If the overlap is positive, then at the strip-shaped overlap zone, the number of light fields incident upon the photosensitive surface is improperly increased from two to three, resulting in a 50% increase of illumination, relative to the case where the adjoining edges of the outer two light fields would ideally exhibit exactly zero overlap. As a result, the illumination is equal to 150% of the ideal case. This is indicated in the above tabulation by 1.50 at line n=3 of the tabulation. Conversely, if the strip-shaded overlap zone in question is a zone of negative overlap, this means that the adjoining edges of the outermost two rectangular light fields are spaced from each other, so that at this strip shaped zone only the light from the central light field is incident upon the photosensitive surface. Thus, whereas nominally two light fields should be contributing light to this strip-shaped zone (namely the central field and one or the other of the outer fields), in fact only one light field is contributing light. As a result, the illumination of this zone of negative overlap is 50% of the nominal value. This is indicated in the tabulation above by 0.50 at line n=3.

In the case where n=4, shown at the right in FIG. 2, the illumination of the strip-shaped overlap zone, in the case of positive overlap, is 133% of the nominal value and, in the case of negative overlap, is 67% of the nominal value.

Of course, even with n as high as four, it will be appreciated that an illumination equal to 133% or 67% of the nominal value will result in a markedly visible stripe in the final copy.

From the tabulation above, it will be seen that when n=21, positive or negative overlap does not too much alter the illumination of the strip-shaped overlap zone, i.e., relative to the nominal value, so that readily perceived stripes will not exist to a comparable degree. Indeed, if fifteen to twenty adjoining component objectives cooperate in the formation of each image element on the photosensitive surface, the stripes in question tend visually to disappear into the image. From the practical viewpoint, however, to implement such a situation it would be necessary to employ a rather great number of lens elements per lens-element row, and furthermore the individual lens elements must then be correspondingly smaller. This can be very difficult to achieve using conventional mass-production techniques for production of the lens bars, and therefore is an inconvenient solution to the striping problem.

In accordance with the present invention, the adjoining boundary lines of adjoining apertures do not extend parallel to the relative-movement direction v, but instead at an angle equal to or greater than 10° relative thereto; or put in another way, at an angle equal to or smaller than 80° relative to the perpendicular to the relative-movement direction v. This will be explained with reference to FIG. 3.

Figure 3:
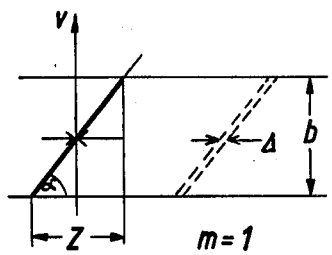

In FIG. 3, the lens apertures are rhomboidal parallelogram shape. Accordingly, the adjoining boundary lines of adjoining parallelogram-shaped light fields—i.e., those boundary lines which in FIG. 3 are not simply perpendicular to the relative-movement direction v—are inclined at an angle $\alpha$ relative to a perpendicular to the relative-movement direction v, as expressly indicated in FIG. 3. FIG. 3 depicts one parallelogram-shaped light field in the middle with part of another one to its left side and part of another to its right side. The zone of positive or negative overlap, represented by the spaced, inclined broken lines, has a transverse dimension $\Delta$ measured exactly perpendicular to the relative-movement direction v. The breadth of this overlap zone, measured exclusively in the relative-movement direction v, is denoted by b in FIG. 3. For the sake of convenience, a second such inclined strip of overlap is shown as an inclined solid line at the left side of the central parallelogram-shaped light field; this inclined strip of overlap likewise is to be understood to have a breadth $\Delta$, and is the overlap zone which will be considered. It will be appreciated that the overlap zone itself is of parallelogram shape, and that its area is exactly equal to the product $\Delta b$. This inclined, and actually parallelogram-shaped overlap zone can, for simplicity, be considered the diagonal of a rectangle of dimensions $Z \times b$, i.e., it being assumed for simplicity that the magnitude of $\Delta$ is negligible compared to the magnitude of Z. The area of this rectangle is Zb and, inasmuch as $Z = b/\tan \alpha$, the area of the $Z \times b$ rectangle can alternatively be expressed as $b^2/\tan \alpha$. Accordingly, the fraction of the total area of the $Z \times b$ rectangle represented by the area of the parallelogram-shaped overlap zone is equal to $\Delta b$ divided by $b/\tan \alpha$, which in turn is equal to $$\frac{\Delta \tan \alpha}{b}.$$

Let it be assumed that $\Delta = 0$, i.e., that there is exactly zero overlap, and let the illumination of the $Z \times b$ rectangle be denoted 1 (unity). With that as definition, then in the case of positive overlap, the total illumination of the $Z \times b$ rectangle is boosted from 1 (unity) to $$1 + \frac{\Delta \tan \alpha}{b}$$

and in the case of negative overlap, the total illumination of the $Z \times b$ rectangle is lowered from 1 (unity) to $$1 - \frac{\Delta \tan \alpha}{b}.$$

It will be understood that the boost or decrease in total illumination just mentioned for the case of standstill, converts to a corresponding boost or decrease in average illumination of the $Z \times b$ rectangle for the case of relative movement in direction v. Accordingly, the amount $(\Delta \tan \alpha)/b$ by which the illumination of the overlap zone is increased or decreased is, during relative movement in direction v, simply and uniformly spread out through the entirety of the $Z \times b$ rectangle, or more precisely over the entirety of the long strip of breadth Z which is formed on the photosensitive surface K during relative movement in direction v.

For the situation depicted in FIG. 3, and for different values of angle α (expressed in degrees) and of breadth b (expressed in distance units), and with Δ=0.1 (expressed in the same distance units), the dependence of the term (Δtanα)/b upon α and upon b is as follows:

| α° | b = | b = 8 | b = 6 |
|---|---|---|---|
| 87° | 0.191 | 0.238 | 0.318 |
| 85° | 0.114 | 0.143 | 0.190 |
| 80° | 0.057 | 0.071 | 0.095 |
| 70° | 0.027 | 0.034 | 0.046 |
| 60° | 0.017 | 0.022 | 0.029 |
| 50° | 0.012 | 0.015 | 0.020 |
| 45° | 0.010 | 0.013 | 0.017 |
| 40° | 0.008 | 0.010 | 0.014 |

It will be clear from the above tabulation that, if b is chosen large enough, then even where angle α is as high as the maximum value of 80° the amount by which illumination of the Z-breadth overlap zone is boosted or lowered as a result of positive or negative overlap along the inclined boundary region is reduced to a visually acceptable level. In effect, the inclined strip-shaped overlap region is spread out or converted into a new overlap region of breadth Z. Thus, compared to the situation depicted, for example, at the left in FIG. 2, the width of any resulting strip or streak, measured perpendicular to the relative-movement direction v, is substantially increased; however, balancing this out is the fact that the illumination of this wider effective Z-breadth overlap zone will now differ very much less from the illumination of the regions of the photosensitive surface K located to either side of this Z-breadth overlap zone.

Figure 4:
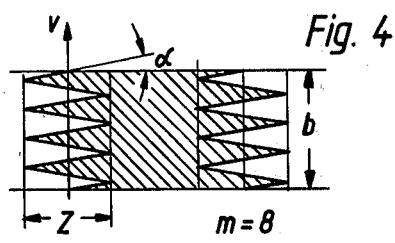

FIG. 4 depicts a modification of the FIG. 3 embodiment, in which instead of a single, straight boundary line of slope α, use is made of a zig-zag boundary line having m=8 constituent sections, i.e., in FIG. 3, m=1, as indicated in the drawing. This makes it possible to use smaller angles α, without an increase in the breadth Z of the inventively expanded overlap zone. The amount by which the illumination of the Z-breadth overlap zone is boosted or lowered, relative to the ideal case of exactly zero overlap, is for positive or negative overlap given by the formula $$1 \pm \frac{m \Delta \tan \alpha}{b}.$$

This is, actually, equivalent in its net effect to the FIG. 3 embodiment. For example, if the Z×b rectangle in FIG. 4 has the same dimensions as in FIG. 3, the amount of the overlap-produced illumination boost or decrease is multiplied by a factor of m, whereas the value of tan α goes down by a factor of m. The practical lower limit on the value of angle α is determined by how sharp the illustrated zig-zag teeth can be made, e.g., determined by the mechanical or photographic production technique employed for manufacture of the lens-aperture plate.

Figure 5:
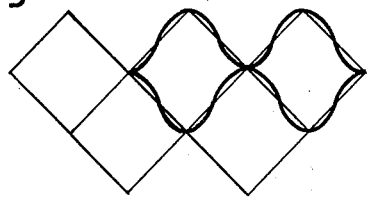

In the embodiments of FIGS. 3 and 4, the amount by which the illumination of the expanded Z-breadth overlap zone will be boosted or lowered by positive or negative adjoining-field overlap is, clearly, very greatly reduced relative to, for example, the n=2 case shown in FIG. 2. In effect, this is achieved by expanding the breadth of the overlap zone from Δ to Z. The fact that the overlap zone—i.e., the zone at which the illumination is, due to overlap, brighter or dimmer than the regions located to either side of the overlap zone—is now much wider is more than made up for by the fact that the difference in illumination as between the overlap zone and the regions to either side of it is now made much lower in magnitude, and therefore much less perceptible to human vision. However, in FIG. 3, and also in FIG. 4, there is an abrupt, albeit now small, difference between the illumination just inside and just outside the Z-breadth overlap zone, and although the overall effect is a net improvement, human vision is capable of detecting abrupt changes in brightness across a surface. FIG. 5 depicts an embodiment in which the brightness of the Z-breadth overlap zone, proceeding in the direction perpendicular to the relative-movement direction v, is not constant and is furthermore designed or fitted to "merge" into the brighness value of the regions adjoining the Z-breadth overlap zone to either side thereof.

In FIG. 5, instead of using straight inclined boundary lines for the lens apertures to be projected onto the photosensitive surface, the boundary lines are curved, so that each successive section of such boundary line will have a different respective slope value. Preferably, use is made of $\sin^2$ or $\cos^2$ curves. These have, intermediate their extreme values, a steep slope, i.e., a maximum value of angle α, but at their extremes angle α is zero, making for a continuous merge of the brightness gradient, measured perpendicular to the relative-motion direction v, from within the expanded overlap zone across the boundary thereof into the region adjoining the expanded overlap zone.

In the foregoing, for example when comparing the parallelogram-shaped lens apertures and light fields of FIG. 3 against the simple square lens apertures and light fields of FIG. 2, it has been assumed for simplicity that the light distribution across the entire surface of each individual light field is uniform. In reality, of course, this is not so. Accordingly, a few words are in order concerning the $\cos^4$ drop-off actually encountered, e.g., because it will be clear that in the case of a parallelogram-shaped lens aperture the points at two vertices of the resultant light field incident on the photosensitive surface are more distant, and may with the present invention be even considerably more distant, from the optical axis of the associated component objective than are the two points at the other two vertices of the parallelogram. This is explained with respect to FIG. 6.

Figure 6:
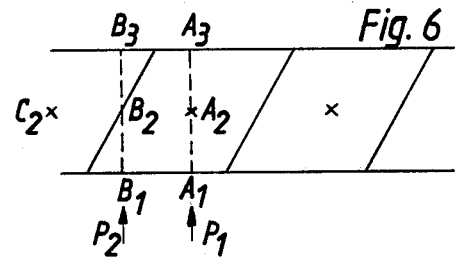

In FIG. 6, the three crosses represent the optical axes of three adjoining component objectives. The optical axis of the objective of interest is denoted A2, and that of its neighbor to the left C2. The objective having optical axis A2 is provided, as shown, with a parallelogram-shaped lens aperture and resulting incident light field, i.e., in the sense already discussed with respect to FIG. 3. Two points P1, P2 on the photosensitive surface being illuminated will be considered, for the case of relative movement in direction v. Point P1 is a point which passes, during such relative movement, right down the middle of the parallelogram-shaped light field and does not at any time enter into the Z-breadth overlap zone. In contrast, point P2 is a point which will pass right down the middle of the Z-breadth overlap zone. Point P1 will successively travel through points A1, A2, A3 in crossing the parallelogram-shaped light field, whereas point P2 will successively travel through points B1, B2, B3 in crossing the Z-breadth overlap zone.

It will be clear that points A1, A3 and B2 all have exactly equal angular distances from optical axis A2. Likewise, it will be clear that point B2 has the same angular distance from adjoining optical axis C2. It will be assumed that the overlap along the inclined boundary line between the two parallelogram-shaped light fields, i.e., associated with A2 and its neighbor to the left C2, is exactly zero, i.e., that no overlap is present. The $\cos^4$ drop-off relationships prevailing then are as follows:

| angular distance to the side | $\cos^4$ | angular distance to associated diagonal |
|---|---|---|
| 5° | 0.985 | ca. 7° |
| 6° | 0.978 | 8,5° |
| 7° | 0.971 | 9,9° |
| 8° | 0.962 | 11,3° |
| 8,5° | 0.957 | |
| 9° | 0.952 | |
| 10° | 0.941 | |
| 11° | 0.929 | |

Thus, for example, if the angular distance of points A1 and B2 from optical axis A2 is 5°, then the angular distance from optical axis A2 to the associated diagonal point B1 is 7°, and for 7° the resulting $\cos^4$ value will be 0.971; and so forth.

Now, as point P1 on the photosensitive surface crosses the b-length light strip, i.e., going along the line A1, A2, A3, it will be exposed by the component objective associated with optical axis A2 to maximum illumination at point A2, and to lesser illumination at points A1 and A3. As point P2 crosses the light strip along line B1, B2, B3, it is exposed to maximum illumination at point B2, this illumination value being lower than for point P1 when the latter point is at maximum-illumination location A2, and point P2 is exposed to lesser illumination, i.e., less than at point B2, at its points of travel B1 and B3. Because the brightness drop-off in going from B2 to B1 or B3 is of the same order of magnitude as in going from A2 to A1 or A3, it follows that the total brightness in going from B1 to B2 will exhibit substantially the same magnitude of fluctuation as in going from A1 to A3, i.e., although the travel line A1, A2, A3 is on the whole brighter than the travel line B1, B2, B3. Accordingly, although points on the photosensitive surface travelling along line A1, A2, A3 are in fact more strongly illuminated than points lying on line B1, B2, B3 the variations in illumination, considered along the lengths of each of these two lines individually, are more or less the same.

In addition to that, the $\cos^4$ drop-off function is progressive, i.e., its gradient measured across the surface of the photosensitive layer does not have a constant value or abrupt changes of value. Accordingly, any image streakiness attributable to the $\cos^4$ drop-off per se, i.e., in contrast to the longitudinally extending dark or bright stripes discussed earlier and not being discussed at this point, are scarcely perceptible to human vision and will anyway not much contribute to a structured image appearance when parallelogram-shaped lens apertures are employed.

However, if one does wish to positively reduce the virtually imperceptible longitudinal streakiness resulting from the $\cos^4$ intensity drop-off, this can be done by tampering with the shapes of the parallelogram-like lens apertures in a sense equalizing the total incidence of light for a point which cross the strip-like exposure zone. For example, it has just been explained that as point P1 travels along line A1, A2, A3 it is more strongly illuminated than is point P2 as the latter travels along line B1, B2, B3. The shapes of the parallelogram-like lens apertures can be altered, by utilizing different lengths b at different parts of the light field. For example, the parallelogram containing optical axis A2 has at its upper side a simple straight-line boundary line extending exactly perpendicular to the relative-motion direction v. Inasmuch as the exposure line A1, A2, A3 is here brighter than the exposure line B1, B2, B3, this upper boundary line could be inwardly concave, so as to very simply shorten the length of line A1, A2, A3 to such an extent that the total illumination associated with this line exactly equals the total illumination associated with line B1, B2, B3. Conversely, the parallelogram-shaped aperture containing optical axis C2 likewise has a straight and perpendicular upper boundary line. Inasmuch as exposure line B1, B2, B3 is of lesser light intensity than A1, A2, A3, this straight upper boundary line could be replaced by an upwardly convex boundary line, i.e., so that the length of exposure line B1, B2, B3 is simply increased so that its associated total illumination becomes equal to that of exposure line A1, A2, A3. In that event, not only would the fluctuations of brightness experienced by points travelling along the respective exposure lines A1, A2, A3 and B1, B2, B3 be substantially the same, but the totalized exposure experienced by points passing along those two lines would likewise be equalized.

Although this can be done, it is to be noted that longitudinal streakiness in the final image attributable per se to the $\cos^4$ intensity drop-off is of little significance, when compared to the longitudinal stripiness resulting per se from non-ideal positive or negative image-element overlap.

FIGS. 7–13 depict various lens and lens-aperture configurations and organizations based upon the considerations just elucidated.

Figure 7A:
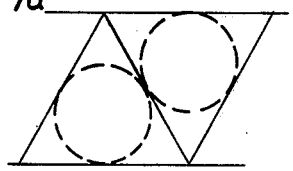
FIGS. 7a-7d, 8a-8d, 9a, 9b, 10a, 11a, 11b, 12a, 12b, 13a, and 13b depict various exemplary embodiments of the inventive intermediate-image-plane lens-aperture plate, i.e., the apertures thereof and the resulting light fields projected onto the photosensitive surface.

FIG. 7a depicts, as broken-line circles, two adjoining component objectives, in a lens-bar projection system wherein each lens bar comprises two, staggered rows of lens elements, one of the illustrated objectives belonging to one row, and the other objective to the other row. The solid-line triangles shown superimposed indicate the shapes, sizes and locations of the lens apertures in the lens-aperture plate employed. FIG. 7b depicts three triangular light fields such as are incident, at any given instant, upon the photosensitive surface, one of these light fields being denoted U1. It will be noted that the Z-breadth zone of potential overlap implied by each inclined boundary line between two adjoining light fields has a breadth such that all these Z-breadth zones directly adjoin.

Figure 7C:
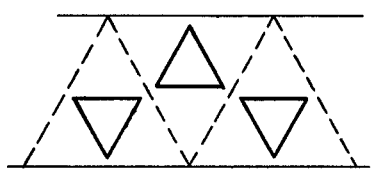
Figure 7B:
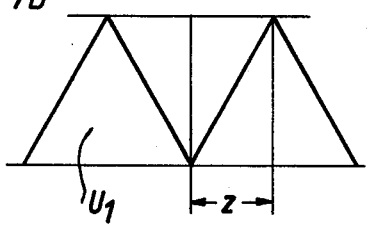
Figure 7D:
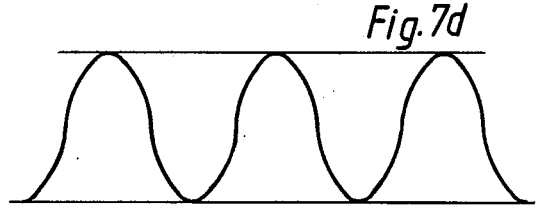

FIG. 7c depicts in solid lines the triangular apertures employed in another embodiment comprising two-lens-row lens bars whose constituent lenticular elements are triangular as indicated by the broken-line triangles, and FIG. 7d depicts the shapes of the resulting roughly triangular light fields cast onto the photosensitive surface. Actually, these are similar to the triangular light fields of FIG. 7b, but are curved in order to achieve the advantages explained earlier with respect to FIG. 5.

Figure 8A:
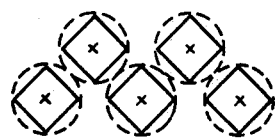

In FIG. 8a, the lenses are circular and arranged on the lens bars as indicated by the broken-line circles, and the lens apertures, shown in solid lines, have the form of squares standing on corner. FIG. 8b depicts the resultant light fields projected onto the photosensitive surface, each likewise having the shape of a square standing or corner, and directly adjoining one another.

Figure 8C:
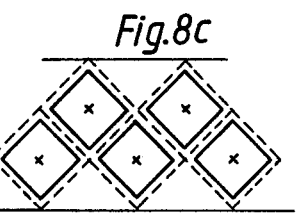
Figure 8B:
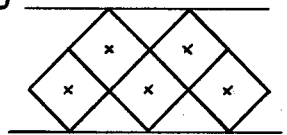
Figure 8D:
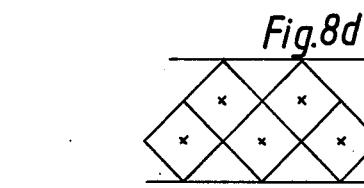

FIG. 8d depicts the same light fields, but implemented using lenses of square shape as indicated by the broken lines in FIG. 8c.

Figure 9A:
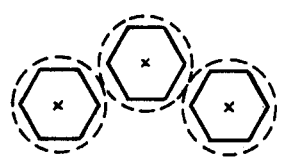
Figure 9B:
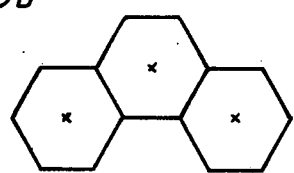

FIG. 9a depicts a two-lens-row projection system employing circular lens elements and hexagonal lens apertures, and FIG. 9b depicts the resultant hexagonal light fields projected onto the photosensitive surface.

Figure 10A:
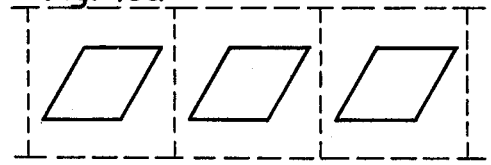
Figure 10B:
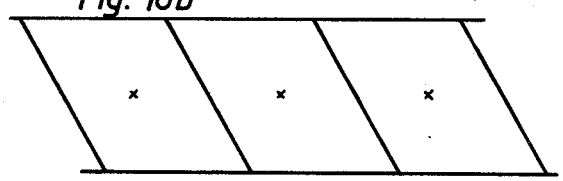

FIG. 10a depicts a one-lens-row plural-lens-bar projection system in which the lens elements are of square shape and the lens apertures are parallelograms, and FIG. 10b depicts the resultant light fields formed on the photosensitive surface. It will be appreciated that instead of parallelograms use could be made of, for example, trapezoids, alternate ones of which stand upside-down.

Figures 11A, 11B:
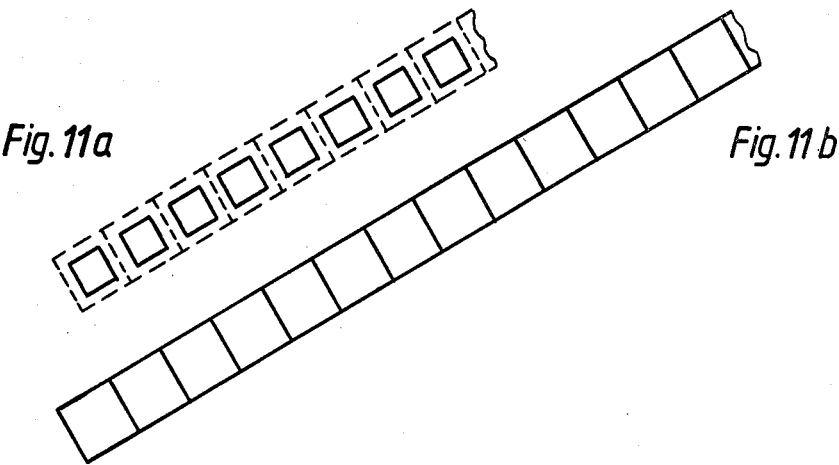

FIG. 11a depicts a one-lens-row embodiment employing square lens elements and square lens apertures, in which very simply the lens bars themselves are inclined relative to the direction of relative movement as between the projection system and the photosensitive surface. The net effect is substantially the same as in FIG. 8. Such an approach is possible where, for example, the photosensitive surface onto which the image is to be projected is planar, but would be inappropriate for the case of a cylindrical photosensitive surface.

Figure 12A:
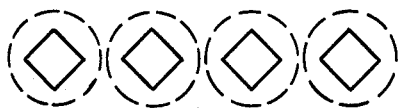
Figure 12B:
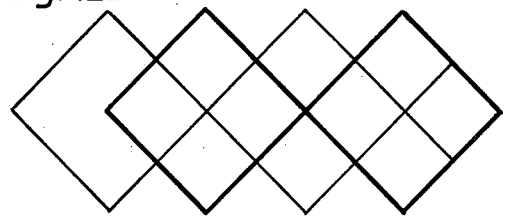

FIG. 12a depicts a one-lens-row embodiment in which the lens elements are circular and the lens apertures have the shapes of squares standing on corner. FIG. 12b depicts overlapping light fields, each likewise having the shape of a square standing on corner; of course, this is achieved by correct selection of size and spacing of the apertures and of the lens bars. If one assumes for simplicity that the light distribution within each individual square light field is uniform within the field, then it will be clear that no matter what travel line be considered all points on such line crossing, in the relative-movement direction v, the transversely extending light strip thusly formed are subjected to the same amount of illumination. To the extent that the $\cos^4$ intensity drop-off is to be taken into account this can be done, in the manner already explained with respect to FIG. 5, by using curved boundary edges whose curves are so shaped as to equalize the total exposure for all v-direction travel lines on the photosensitive surface. Such an approach can lead to shapes similar to those shown in FIGS. 13a and 13b.

Figure 13A:
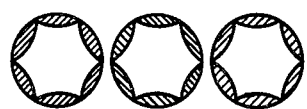
Figure 13B:
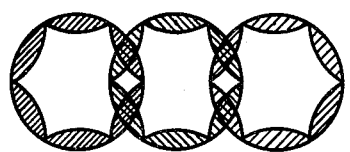

FIG. 13a depicts three adjoining, generally hexagonal lens apertures spaced from each other on the lens aperture plate. The six shaded areas surrounding each generally hexagonal aperture are provided to show the exact shape of the aperture. In particular, the illustrated shape, i.e., the white area, results when each of six equal arcs of a circle is flipped radially inward to the radially inward side of one leg of a regular hexagon circumscribed by such circle. It is emphasized that the apertures per se are represented by the white areas. FIG. 13b depicts the overlap, on the photosensitive surface, of the generally hexagonal light fields. It will be understood that this illustrated overlap, and likewise that in FIG. 12b, is depicted for the case where the lens elements are all uniformly spaced along the lens bars, i.e., without improper image-element overlap; if there arises improper image-element overlap due to non-uniform lens-element spacing or the like, then the overlaps illustrated in FIG. 13b will be altered relative to what is shown.

The shape employed in FIG. 13 is particularly advantageous. Thus, points which will travel along a line intersecting, for example, the optical axis of the middle one of the three illustrated light fields pass along an exposure line which is shortened, i.e., as measured in the relative-movement direction; this compensates for the fact that, along this travel line, the light intensity is the greatest. Points on travel lines located to the left or the right thereof, i.e., further from the optical axis and therefore travelling along lines of lesser light intensity, pass along exposure lines of greater and greater length, so as to equalize the total illumination for all travel lines irrespective of whether they are close to or far from the nearest optical axis.

In the embodiments depicted in FIGS. 7–11 each component objective cooperates with a lens aperture to contribute light to only one light field. I.e., ignoring the development of improper light-field overlap, the adjoining light fields nominally adjoin perfectly and exactly, in the sense for example of the n=2 case depicted in FIG. 2. However, it will be understood that the techniques discussed above likewise have applicability where one or more adjoining component objectives are to cooperate in the production of image elements, e.g., in the sense of the n=3 and n=4 cases depicted in FIG. 2. Thus, whereas in FIG. 12b the situation depicted is basically of the n=2 type, higher values of n, especially however those not high enough to themselves constitute a solution to the image-element overlap problem, likewise fall within the scope of the invention.

It will be understood that each of the elements described above, or two or more together, may also find a useful application in other types of constructions differing from the types described above.

While the invention has been illustrated and described as embodied in a lens-bar projection system used in a copying machine, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a copying machine of the type which comprises a projection system and in which relative movement is effected between the projection system and a photosensitive surface in a predetermined relative-movement direction to successively project successive strip-shaped zones of an original onto successive strip-shaped zones of the photosensitive surface, the projection system being of the type comprising a plurality of lens bars, each lens bar comprising at least one row of lenticular elements extending transverse to the relative-movement direction, the projection system comprising at least one row of component projection objectives, each such row of component projection objectives likewise extending transverse to the relative-movement direction, the individual projection objectives being constituted by respective corresponding ones of the lenticular elements of the plurality of lens bars, the lens bars forming component images on the photosensitive surface and also forming an intermediate image plane; the projection system additionally including a lens-aperture structure provided with at least one row of lens apertures located in the intermediate image plane, the adjoining boundaries of adjoining ones of the lens apertures extending at an angle relative to the direction perpendicular to said relative-movement direction, said angle being at most equal to 80°, the lens apertures being triangular, alternate ones of the triangular lens apertures being right-side-up and up-side-down.

2. In a copying machine of the type which comprises a projection system and in which relative movement is effected between the projection system and a photosensitive surface in a predetermined relative-movement direction to successively project successive strip-shaped zones of an original onto successive strip-shaped zones of the photosensitive surface, the projection system being of the type comprising a plurality of lens bars, each lens bar comprising at least one row of lenticular elements extending transverse to the relative-movement direction, the projection system comprising at least one row of component projection objectives, each such row of component projection objectives likewise extending transverse to the relative-movement direction, the individual projection objectives being constituted by respective corresponding ones of the lenticular elements of the plurality of lens bars, the lens bars forming component images on the photosensitive surface and also forming an intermediate image plane; the projection system additionally including a lens-aperture structure provided with at least one row of lens apertures located in the intermediate image plane, the adjoining boundaries of adjoining ones of the lens apertures extending at an angle relative to the direction perpendicular to said relative-movement direction, said angle being at most equal to 80°, the lens apertures being trapezoidal.

3. In a copying machine of the type which comprises a projection system and in which relative movement is effected between the projection system and a photosensitive surface in a predetermined relative-movement direction to successively project successive strip-shaped zones of an original onto successive strip-shaped zones of the photosensitive surface, the projection system being of the type comprising a plurality of lens bars, each lens bar comprising at least one row of lenticular elements extending transverse to the relative-movement direction, the projection system comprising at least one row of component projection objectives, each such row of component projection objectives likewise extending transverse to the relative-movement direction, the individual projection objectives being constituted by respective corresponding ones of the lenticular elements of the plurality of lens bars, the lens bars forming component images on the photosensitive surface and also forming an intermediate image plane; the projection system additionally including a lens-aperture structure provided with at least one row of lens apertures located in the intermediate image plane, the adjoining boundaries of adjoining ones of the lens apertures extending at an angle relative to the direction perpendicular to said relative-movement direction, said angle being at most equal to 80°, the lens apertures being quadrilaterals standing on-corner, the lens aperture structure having plural staggered rows of such apertures.

4. In a copying machine of the type which comprises a projection system and in which relative movement is effected between the projection system and a photosensitive surface in a predetermined relative-movement direction to successively project successive strip-shaped zones of an original onto successive strip-shaped zones of the photosensitive surface, the projection system being of the type comprising a plurality of lens bars, each lens bar comprising at least one row of lenticular elements extending transverse to the relative-movement direction, the projection system comprising at least one row of component projection objectives, each such row of component projection objectives likewise extending transverse to the relative-movement direction, the individual projection objectives being constituted by respective corresponding ones of the lenticular elements of the plurality of lens bars, the lens bars forming component images on the photosensitive surface and also forming an intermediate image plane; the projection system additionally including a lens-aperture structure provided with at least one row of lens apertures located in the intermediate image plane, the adjoining bondaries of adjoining ones of the lens apertures extending at an angle relative to the direction perpendicular to said relative-movement direction, said angle being at most equal to 80°, the lens apertures being hexagonal, the lens aperture structure having plural staggered rows of such apertures.

5. In a copying machine of the type which comprises a projection system and in which relative movement is effected between the projection system and a photosensitive surface in a predetermined relative-movement direction to successively project successive strip-shaped zones of an original onto successive strip-shaped zones of the photosensitive surface, the projection system being of the type comprising a plurality of lens bars, each lens bar comprising at least one row of lenticular elements extending transverse to the relative-movement direction, the projection system comprising at least one row of component projection objectives, each such row of component projection objectives likewise extending transverse to the relative-movement direction, the individual projection objectives being constituted by respective corresponding ones of the lenticular elements of the plurality of lens bars, the lens bars forming component images on the photosensitive surface and also forming an intermediate image plane; the projection system additionally including a lens-aperture structure provided with at least one row of lens apertures located in the intermediate image plane, the adjoining boundaries of adjoining ones of the lens apertures extending at an angle relative to the direction perpendicular to said relative-movement direction, said angle being at most equal to 80°, the lens apertures each being six-sided, each of the six sides of each lens aperture being concave and having at least approximately the curvature of a circle which would circumscribe the six-sided lens aperture, the size and spacing of the apertures being such that the six-sided light fields projected onto the photosensitive surface overlap into one another at adjoining vertices.

6. In a copying machine of the type which comprises a projection system and in which relative movement is effected between the projection system and a photosensitive surface in a predetermined relative-movement direction to successively project successive strip-shaped zones of an original onto successive strip-shaped zones of the photosensitive surface, the projection system being of the type comprising a plurality of lens bars, each lens bar comprising at least one row of lenticular elements extending transverse to the relative-movement direction, the projection system comprising at least one row of component projection objectives, each such row of component projection objectives likewise extending transverse to the relative-movement direction, the individual projection objectives being constituted by respective corresponding ones of the lenticular elements of the plurality of lens bars, the lens bars forming component images on the photosensitive surface and also forming an intermediate image plane; the projection system additionally including a lens-aperture structure provided with at least one row of lens apertures located in the intermediate image plane, the adjoining boundaries of adjoining ones of the lens apertures extending at an angle relative to the direction perpendicular to said relative-movement direction, said angle being at most equal to 80°, the lens apertures having substantially the shape of regular polygons, the lenticular elements being circular, the light fields projected onto the photosensitive surface having polygonal shapes corresponding to those of the lens apertures, the circular lenticular elements having diameters which are greater than the diameters of imaginary circles exactly circumscribing the polygonal lens apertures but smaller than the diameters of imaginary circles exactly circumscribed by the polygonal light fields.

7. In a copying machine of the type which comprises a projection system and in which relative movement is effected between the projection system and a photosensitive surface in a predetermined relative-movement direction to successively project successive strip-shaped zones of an original onto successive strip-shaped zones of the photosensitive surface, the projection system being of the type comprising a plurality of lens bars, each lens bar comprising at least one row of lenticular elements extending transverse to the relative-movement direction, the projection system comprising at least one row of component projection objectives, each such row of component projection objectives likewise extending transverse to the relative-movement direction, the individual projection objectives being constituted by respective corresponding ones of the lenticular elements of the plurality of lens bars, the lens bars forming component images on the photosensitive surface and also forming an intermediate image plane; the projection system additionally including a lens-aperture structure provided with at least one row of lens apertures located in the intermediate image plane, the adjoining boundaries of adjoining ones of the lens apertures extending at an angle relative to the direction perpendicular to said relative-movement direction, said angle being at most equal to 80°, the shapes, sizes and spacing of the lens apertures being such that they project onto the photosensitive surface individual light fields of corresponding shape, together constituting a strip-shaped zone of incident light extending transverse to said relative-movement direction, all lines on the photosensitive surface which extend in said relative-movement direction necessarily comprising a respective line segment located within said strip-shaped zone of incident light, the shapes, sizes and spacing of the lens apertures being such that the lengths of all such line segments as measured in said relative-movement direction are all the same irrespective of where such line segments are located relative to the two ends of the strip-shaped zone of incident light.

8. The copying machine defined in claim 7, the lens apertures each being an equilateral polygon producing incident light fields of corresponding polygonal shape adjoining each other with at most limited overlap limited to the marginal portions of adjoining polygonal light fields.

9. In a copying machine of the type which comprises a projection system and in which relative movement is effected between the projection system and a photosensitive surface in a predetermined relative-movement direction to successively project successive strip-shaped zones of an original onto successive strip-shaped zones of the photosensitive surface, the projection system being of the type comprising a plurality of lens bars, each lens bar comprising at least one row of lenticular elements extending transverse to the relative-movement direction, the projection system comprising at least one row of component projection objectives, each such row of component projection objectives likewise extending transverse to the relative-movement direction, the individual projection objectives being constituted by respective corresponding ones of the lenticular elements of the plurality of lens bars, the lens bars forming component images on the photosensitive surface and also forming an intermediate image plane; the projection system additionally including a lens-aperture structure provided with at least one row of lens apertures located in the intermediate image plane, the adjoining boundaries of adjoining ones of the lens apertures extending at an angle relative to the direction perpendicular to said relative-movement direction, said angle being at most equal to 80°, the lens apertures each being an equiangular polygon producing incident light fields of corresponding polygonal shape adjoining each other with at most limited overlap limited to the marginal portions of adjoining polygonal light fields.

10. In a copying machine of the type which comprises a projection system and in which relative movement is effected between the projection system and a photosensitive surface in a predetermined relative-movement direction to successively project successive strip-shaped zones of an original onto successive strip-shaped zones of the photosensitive surface, the projection system being of the type comprising a plurality of lens bars, each lens bar comprising at least one row of lenticular elements extending transverse to the relative-movement direction, the projection system comprising at least one row of component projection objectives, each such row of component projection objectives likewise extending transverse to the relative-movement direction, the individual projection objectives being constituted by respective corresponding ones of the lenticular elements of the plurality of lens bars, the lens bars forming component images on the photosensitive surface and also forming an intermediate image plane; the projection system additionally including a lens-aperture structure provided with at least one row of lens apertures located in the intermediate image plane, the adjoining boundaries of adjoining ones of the lens apertures extending at an angle relative to the direction perpendicular to said relative-movement direction, said angle being at most equal to 80°, the sizes, shape and spacing of the lens apertures being such that they produce upon the photosensitive surface respective light fields of corresponding shape which adjoin each other with at most limited overlap limited to the marginal portions of the light fields.

11. In a copying machine of the type which comprises a projection system and in which relative movement is effected between the projection system and a photosensitive surface in a predetermined relative-movement direction to successively project successive strip-shaped zones of an original onto successive strip-shaped zones of the photosensitive surface, the projection system being of the type comprising a plurality of lens bars, each lens bar comprising at least one row of lenticular elements extending transverse to the relative-movement direction, the projection system comprising at least one row of component projection objectives, each such row of component projection objectives likewise extending transverse to the relative-movement direction, the individual projection objectives being constituted by respective corresponding ones of the lenticular elements of the plurality of lens bars, the lens bars forming component images on the photosensitive surface and also forming an intermediate image plane; the projection system additionally including a lens-aperture structure provided with at least one row of lens apertures located in the intermediate image plane, the adjoining boundaries of adjoining ones of the lens apertures extending at an angle relative to the direction perpendicular to said relative-movement direction, said angle being at most equal to 80°, each component projection objective having an optical axis intersecting the photosensitive surface, each lens aperture as projected onto the photosensitive surface containing the respective intersection point, the shapes, sizes and spacing of the lens apertures being such that they project onto the photosensitive surface individual light fields of corresponding shape which together constitute a strip-shaped zone of incident light extending transverse to said relative-movement direction, all lines on the photosensitive surface which extend in said relative-movement direction necessarily comprising respective line segment located within said strip-shaped zone of incident light, the shapes, sizes and spacing of the lens apertures being such that the lengths of those of said line segments which intersect optical-axis intersection points are smaller and smaller than the lengths of those of said line segments located farther and farther away from optical-axis intersection points.

12. In a copying machine of the type which comprises a projection system and in which relative movement is effected between the projection system and a photosensitive surface in a predetermined relative-movement direction to successively project successive strip-shaped zones of an original onto successive strip-shaped zones of the photosensitive surface, the projection system being of the type comprising a plurality of lens bars, each lens bar comprising at least one row of lenticular elements extending transverse to the relative-movement direction, the projection system comprising at least one row of component projection objectives, each such row of component projection objectives likewise extending transverse to the relative-movement direction, the individual projection objectives being constituted by respective corresponding ones of the lenticular elements of the plurality of lens bars, the lens bars forming component images on the photosensitive surface and also forming an intermediate image plane; the projection system additionally including a lens-apertures structure provided with at least one row of lens apertures located in the intermediate image plane, the adjoining boundaries of adjoining ones of the lens apertures extending at an angle relative to the direction perpendicular to said relative-movement direction, said angle being at most equal to 80°, the lens apertures being parallelogram-shaped.

13. In a copying machine of the type which comprises a projection system and in which relative movement is effected between the projection system and a planar photosensitive surface in a predetermined relative-movement direction to successively project successive strip-shaped zones of an original onto successive strip-shaped zones of the photosensitive surface, the projection system being of the type comprising a plurality of lens bars, each lens bar comprising at least one row of lenticular elements extending transverse to the relative-movement direction, the projection system comprising at least one row of component projection objectives, each such row of component projection objectives likewise extending transverse to the relative-movement direction, the individual projection objectives being constituted by respective corresponding ones of the lenticular elements of the plurality of lens bars, the lens bars forming component images on the photosensitive surface and also forming an intermediate image plane; the projection system additionally including a lens-aperture structure provided with at least one row of lens apertures located in the intermediate image plane, the adjoining boundaries of adjoining ones of the lens apertures extending at an angle relative to the direction perpendicular to said relative-movement direction, said angle being at most equal to 80°, the lens apertures being rectangles, the lens bars extending parallel to the planar photosensitive surface but non-perpendicular to said relative-movement direction.

14. In a copying machine of the type which comprises a projection system and in which relative movement is effected between the projection system and a photosensitive surface in a predetermined relative-movement direction to successively project successive strip-shaped zones of an original onto successive strip-shaped zones of the photosensitive surface, the projection system being of the type comprising a plurality of lens bars, each lens bar comprising at least one row of lenticular elements extending transverse to the relative-movement direction, the projection system comprising at least one row of component projection objectives, each such row of component projection objectives likewise extending transverse to the relative-movement direction, the individual system comprising at least one row of component projection objectives, each such row of component projection objectives likewise extending transverse to the relative-movement direction, the individual projection objectives being constituted by respective corresponding ones of the lenticular elements of the plurality of lens bars, the lens bars forming component images on the photosensitive surface and also forming an intermediate image plane; the projection system additionally including a lens-aperture structure provided with at least one row of lens apertures located in the intermediate image plane, the adjoining boundaries of adjoining ones of the lens apertures extending at an angle relative to the direction perpendicular to said relative-movement direction, said angle being at most equal to 80°, the lens apertures being parallelograms, the size and spacing of the apertures being such that parallelogram-shaped light fields are projected onto the photosensitive surface with the adjoining corners of adjoining parallelogram-shaped light fields overlapping each other.

15. In a copying maching of the type which comprises a projection system and in which relative movement is effected between the projection system and a photosensitive surface in a predetermined relative-movement direction to successively project successive strip-shaped zones of an original onto successive strip-shaped zones of the photosensitive surface, the projection system being of the type comprising a plurality of lens bars, each lens bar comprising at least one row of lenticular elements extending transverse to the relative-movement direction, the projection system comprising at least one row of component projection objectives, each such row of component projection objectives likewise extending transverse to the relative-movement direction, the individual projection objectives being constituted by respective corresponding ones of the lenticular elements of the plurality of lens bars, the lens bars forming component images on the photosensitive surface and also forming an intermediate image plane; the projection system additionally including a lens-aperture structure provided with at least one row of lens apertures located in the intermediate image plane, the adjoining boundaries of adjoining ones of the lens apertures extending at an angle relative to the direction perpendicular to said relative-movement direction said angle being at most equal to 80°, said adjoining boundaries being curved lines having at least approximately the shape of a $\sin^2$ curve.

16. In a copying machine of the type which comprises a projection system and in which relative movement is effected between the projection system and a photosensitive surface in a predetermined relative-movement direction to successively project successive strip-shaped zones of an original onto successive strip-shaped zones of the photosensitive surface, the projection system being of the type comprising a plurality of lens bars including two projection lens bars and an intermediate field lens bar, each lens bar comprising at least one row of lenticular elements extending transverse to the relative-movement direction, the projection system comprising at least one row of component projection objectives, each such row of component projection objectives likewise extending transverse to the relative-movement direction, the individual projection objectives being constituted by respective corresponding ones of the lenticular elements of the plurality of lens bars, the lens bars forming component images on the photosensitive surface and also forming an intermediate image plane; the projection system additionally including a lens-aperture structure provided with at least one row of lens apertures located in the intermediate image plane, the adjoining boundaries of adjoining ones of the lens apertures extending at an angle relative to the direction perpendicular to said relative-movement direction, said angle being at most equal to 80°, the lenticular elements on the field lens bars individually having shapes the same as the shapes of the lens apertures.

17. The copying machine defined in claim 16, the lenticular elements and lens apertures being polygonal.

* * * * *